United States Patent
Sadowsky et al.

(10) Patent No.: US 7,353,349 B2
(45) Date of Patent: Apr. 1, 2008

(54) METHOD AND APPARATUS FOR REORDERING MEMORY REQUESTS FOR PAGE COHERENCY

(75) Inventors: Jonathan B. Sadowsky, El Dorado Hills, CA (US); Aditya Navale, El Dorado Hills, CA (US)

(73) Assignee: Intel Corporation, Santa Clara, CA (US)

( * ) Notice: Subject to any disclaimer, the term of this patent is extended or adjusted under 35 U.S.C. 154(b) by 304 days.

(21) Appl. No.: 11/137,700

(22) Filed: May 24, 2005

(65) Prior Publication Data

US 2005/0248579 A1    Nov. 10, 2005

Related U.S. Application Data

(63) Continuation of application No. 09/968,260, filed on Sep. 28, 2001, now Pat. No. 6,898,679.

(51) Int. Cl.
*G06F 12/00* (2006.01)

(52) U.S. Cl. .................... 711/158; 711/105; 710/40

(58) Field of Classification Search ............ 711/158, 711/105; 710/40
See application file for complete search history.

(56) References Cited

U.S. PATENT DOCUMENTS

| | | | |
|---|---|---|---|
| 4,833,601 A | 5/1989 | Barlow et al. | 711/141 |
| 5,802,357 A | 9/1998 | Li et al. | 707/2 |
| 5,822,772 A | 10/1998 | Chan et al. | 711/158 |
| 5,948,081 A | 9/1999 | Foster | 710/40 |
| 5,974,571 A | 10/1999 | Riesenman et al. | 714/47 |
| 5,996,036 A | 11/1999 | Kelly | 710/110 |
| 6,021,473 A | 2/2000 | Davis et al. | 711/141 |
| 6,088,772 A | 7/2000 | Harriman et al. | 711/158 |
| 6,141,709 A | 10/2000 | Cutter | 710/100 |
| 6,311,256 B2 | 10/2001 | Halligan et al. | 711/158 |
| 6,343,341 B1 | 1/2002 | Cabrera et al. | 711/111 |
| 6,633,298 B2 | 10/2003 | Ashburn et al. | 345/537 |
| 6,680,737 B2 | 1/2004 | Ashburn et al. | 345/531 |

*Primary Examiner*—Brian R. Peugh
(74) *Attorney, Agent, or Firm*—Philip A. Pedigo

(57) ABSTRACT

A method and apparatus for reordering memory requests for page coherency. Various data streams are frequently found in separate areas of physical memory (i.e. each data stream is found in a separate memory "page"). Because these requests from different streams become intermixed, a certain amount of latency results from the resulting page "breaks." These page breaks occur when consecutive requests are from different data streams, requiring accesses to different memory pages. When several separate streams of data are requested by a client, page coherency between requests diminishes. A reordering device regains lost page coherency, thereby reducing the amount of latency and increasing overall system performance.

6 Claims, 10 Drawing Sheets

METHOD AND APPARATUS FOR REORDERING MEMORY REQUESTS FOR PAGE COHERENCY

Related Applications

This application is a Continuation of U.S. Ser. No. 09/968,260 filed on Sep. 28, 2001 and issued as U.S. Pat. No. 6,898,679 on May 24, 2005.

BACKGROUND OF THE INVENTION

The present invention pertains to a method and apparatus for reordering memory requests. More particularly, the present invention pertains to a method of improving the performance of graphic texture memory fetches through the implementation of a reordering device.

As is known in the art, the system cache in a computer system serves to enhance the system performance of modern computers. For example, in an integrated graphics chipset, the cache can maintain data between several clients and the relatively slower system memory by holding recently accessed memory locations in case they are needed again. The cache can maintain data for several clients, such as the central processing unit (CPU) or the graphics texture engine.

A 3-D graphics texture engine requires large amounts of texture data. Utilizing the cache, some of the needed texture data can be retrieved as a result of a "cache hit." A cache hit is a request to read from memory that may be satisfied from the cache without using main (or another) memory.

Within some integrated chipset designs, the cache can service a client working on several data streams at any one time. In particular, a 3-D graphics texture engine requires constant accesses to various data streams to utilize a technique known as MIP (Multum In Parvo, Latin for "many things in a small place") mapping. The graphics texture fetches to the cache occur in a round-robin fashion, such that sets of requests to a particular stream are ungrouped (i.e. the requests from one stream become intermixed with those requests from other streams).

Furthermore, the various data streams are frequently found in separate areas of physical memory (i.e. each data stream is found in a separate memory "page"). In the event of various "cache misses" amongst various data streams, the requests are sent out to memory to be fulfilled. As mentioned above, these requests to memory are inherently out of order. Because these requests from different streams become intermixed, a certain amount of latency results from the resulting page "breaks." These page breaks occur when consecutive requests are from different data streams, requiring accesses to different memory pages. This requires opening and closing one page, and then, opening and closing another memory page, inducing latency.

When several separate streams of data are requested by a client, page coherency between requests diminishes. As the number of page breaks expands as a result of lost page coherency, the amount of latency increases, thereby reducing overall system performance.

In view of the above, there is a need for a method and apparatus for reordering memory requests for page coherency of client data requests in an integrated graphics chipset environment.

DETAILED DESCRIPTION OF THE DRAWINGS

Figure 1:
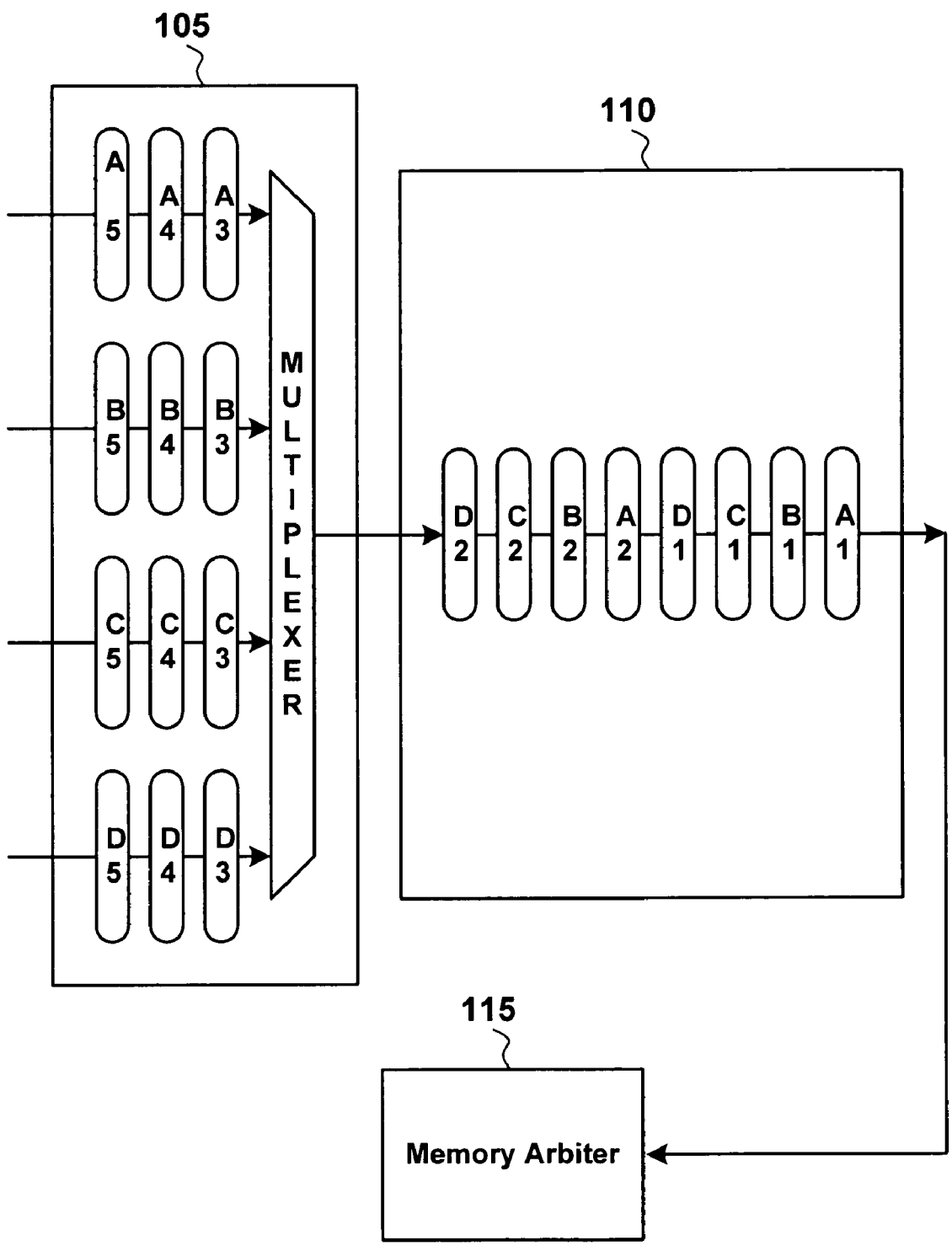
FIG. 1 is a block diagram of a prior art cache system.

Referring to FIG. 1, a block diagram of a prior art cache system receiving and sending requests from several data streams. In this system, cache 110 receives data requests from a client 105 (e.g. a texture graphics engine) to fetch data from several data streams. The multiplexer within client 105 of the prior art system intermixes the data stream requests. Cache 110 receives the requests and returns the cache hits to client 105. When cache 110 receives the cache miss requests and sends them out to memory arbiter 115, it sends the requests in the same order, in an inherently out-of-order series, without retaining page coherency. Memory arbiter 115 then retrieves the data requests from system memory (not shown) and proceeds to fulfill the requests in the order received.

Figure 2:
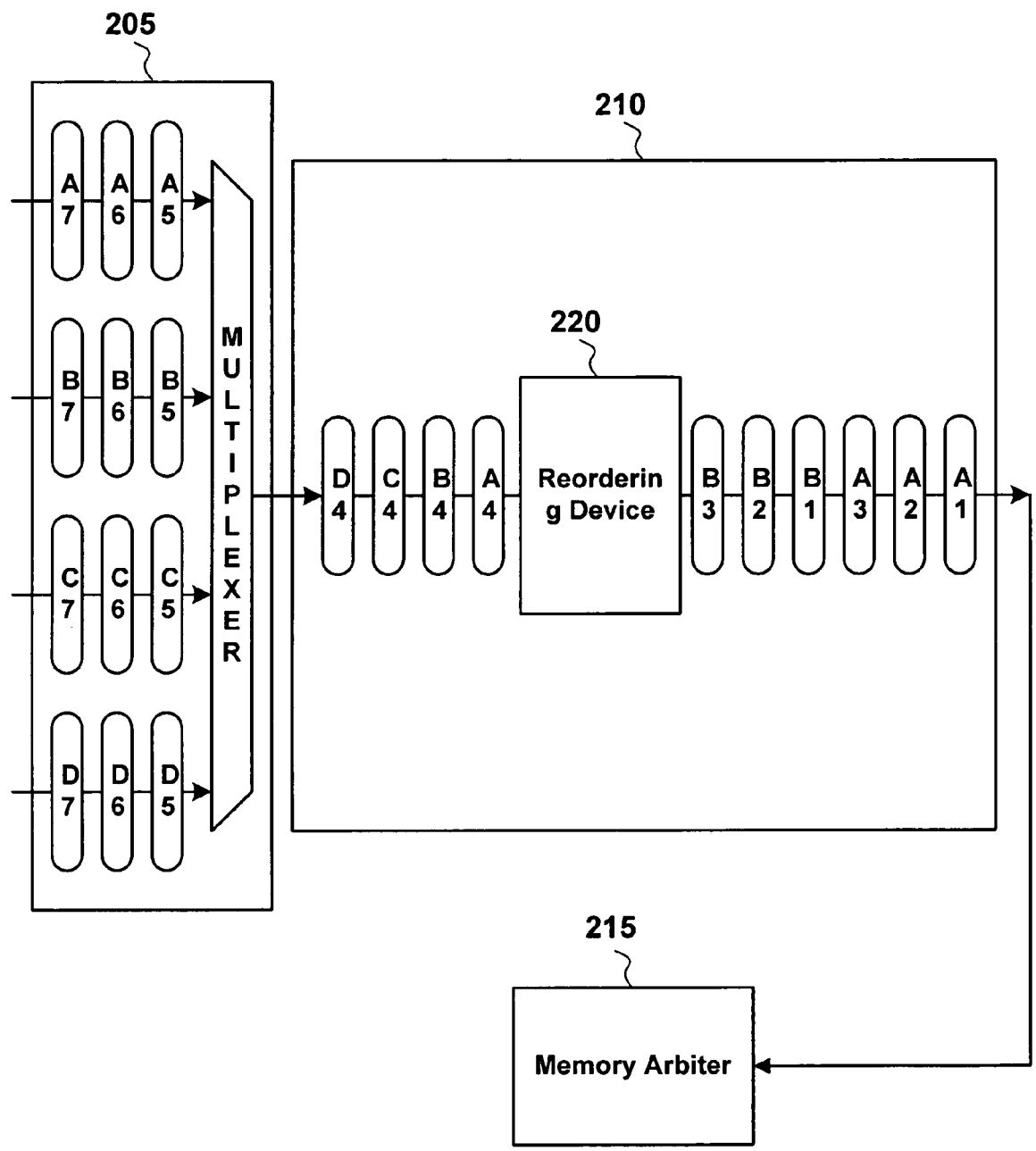
FIG. 2 is a block diagram of a portion of a cache system employing an embodiment of the present invention.

Referring to FIG. 2, a block diagram of a portion of a cache system employing an embodiment of the present invention is shown. In this embodiment, cache 210 receives data requests from a client 205 to fetch data from several data streams. The multiplexer found within client 205 intermixes the data stream requests. Cache 210 receives the requests and returns the cache hits to client 205. When cache 210 receives the cache miss requests, it forwards the request through reordering device 220. Reordering device 220 takes the inherently out-of-order series of requests and reorders the requests internally. Reordering device 220 outputs the requests such that, when cache 210 presents the requests to memory arbiter 215, some of the lost page coherency of an out-of-order series of requests is regained.

Figure 3:
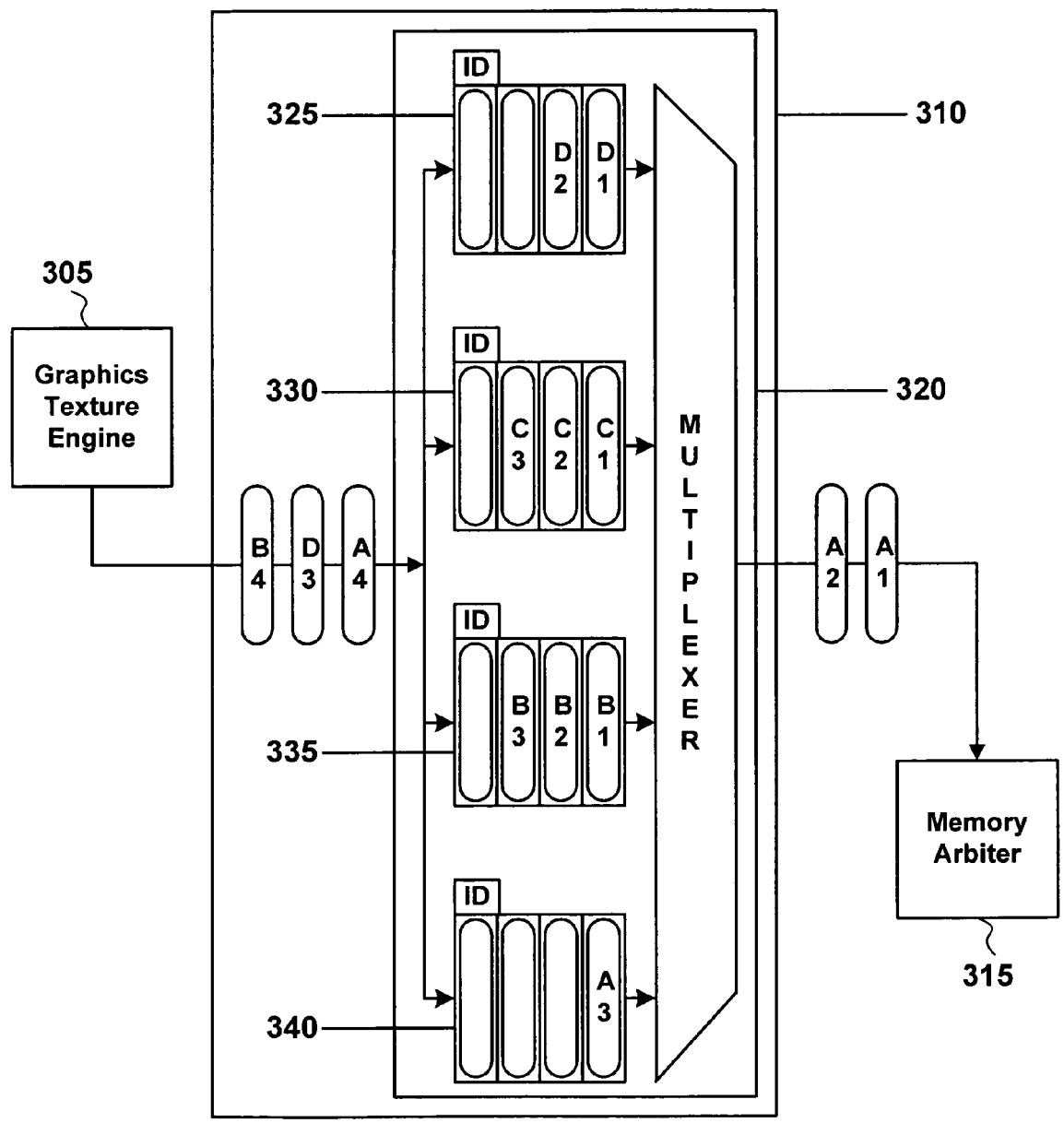
FIG. 3 is a block diagram of a reordering device employing an embodiment of the present invention.

Referring to FIG. 3, a block diagram of a reordering device employing an embodiment of the present invention is shown. In this embodiment, cache 310 receives data requests from graphics texture engine 305 to fetch data from several data streams. The multiplexer found within graphics texture engine 305 intermixes the data stream requests. Cache 310 receives the requests and returns the cache hits to client 305. When cache 310 receives the cache miss requests, it forwards the request through reordering device 320. Reordering device 320 takes the inherently out-of-order series of requests and reorders the requests internally. Reordering device 320 utilizes First-In First-Out buffers (FIFOs). Reordering device 320 includes FIFOs 325, 330, 325 and 340, each with a depth of four entry requests. FIFOs 325, 330, 325 and 340 are arranged such that the incoming out-of-order requests can be written into any one of the FIFOs. Each of the FIFOs 325, 330, 325 and 340 can be tagged with a physical memory page identification tag (a page ID), which corresponds to the requests from the various memory pages. Each request is placed in a FIFO with the matching page ID. In this way, requests that fall on the same physical memory page are placed together in the same FIFO. When reading out of the reordering device 320, all requests that correspond to the same memory page are removed from a FIFO before the requests from any other FIFOs are read. The multiplexer within the reordering device 320 selects the FIFOs 325, 330, 325 and 340 in a round-robin fashion, reading and emptying all the requests in each FIFO in succession. FIFOs are only "flushed" under certain flush conditions. Furthermore, each of the requests is assigned a flush class ID, stored in each FIFO entry along with the data request in that entry. A flush class is a group of requests which will be flushed together. If a flush condition occurs, the contents of the FIFOs 325, 330, 325 and 340 are emptied. Reordering device 320 outputs the requests in such a way that, when cache 310 presents the requests to memory arbiter 315, page coherency is created. If a flush condition does not occur, the FIFOs continue to build up requests.

The flush conditions which are employed in an embodiment of the present invention are discussed below in FIG. 3 through FIG. 8. Note that only one FIFO may be assigned to a physical memory page of a given flush class. Therefore, each FIFO can only contain request entries from a single physical memory page per flush.

Figure 4:
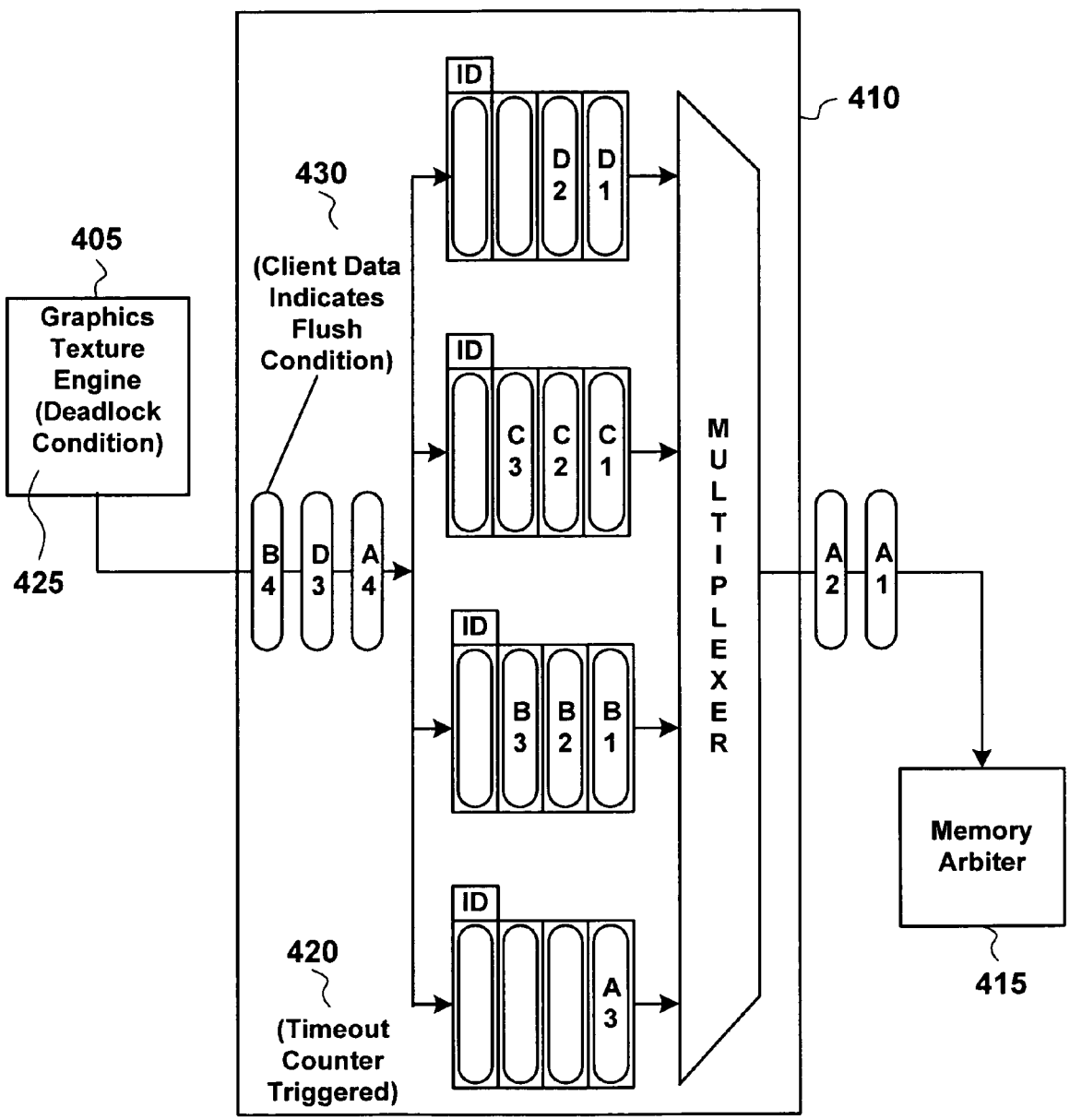
FIG. 4 is a block diagram of a reordering device under a flush condition employing an embodiment of the present invention.

Referring to FIG. 4, a block diagram of a reordering device under a flush condition employing an embodiment of the present invention is shown. The flush results from an external condition, without a request. In this embodiment, cache 410 receives data requests from graphics texture engine 405 to fetch data from several data streams. The multiplexer found within graphics texture engine 405 intermixes the data stream requests. Cache 410 receives the requests and returns the cache hits to client 405. When cache 410 receives the cache miss requests, it forwards the request through the reordering buffers and outputs the reordered requests to memory arbiter 415. If any condition exists that indicates to the reorder buffers to flush the FIFOs and the condition exists when no other requests are being placed in the reorder buffers, the FIFOs are flushed. Various events conditions may generate this type of flush: timeout counter triggered 420; deadlock condition exists 425; and requesting client data indicates a flush condition 430. Timeout counter 420 may be triggered when the cache recognizes a stall in forward progress from the texture engine. When the engine stalls, a timeout counter expires, and a flush initiated. A deadlock condition 425 may be recognized within the graphics texture engine itself, thus initiating a flush. As an example of requesting client data indicating a flush condition 430, the texture engine may complete a "primitive." (i.e. a basic graphical element; for example, a triangle). When the request for the primitive is finished, this indicates an end condition, thereby initiating a flush.

Figure 5:
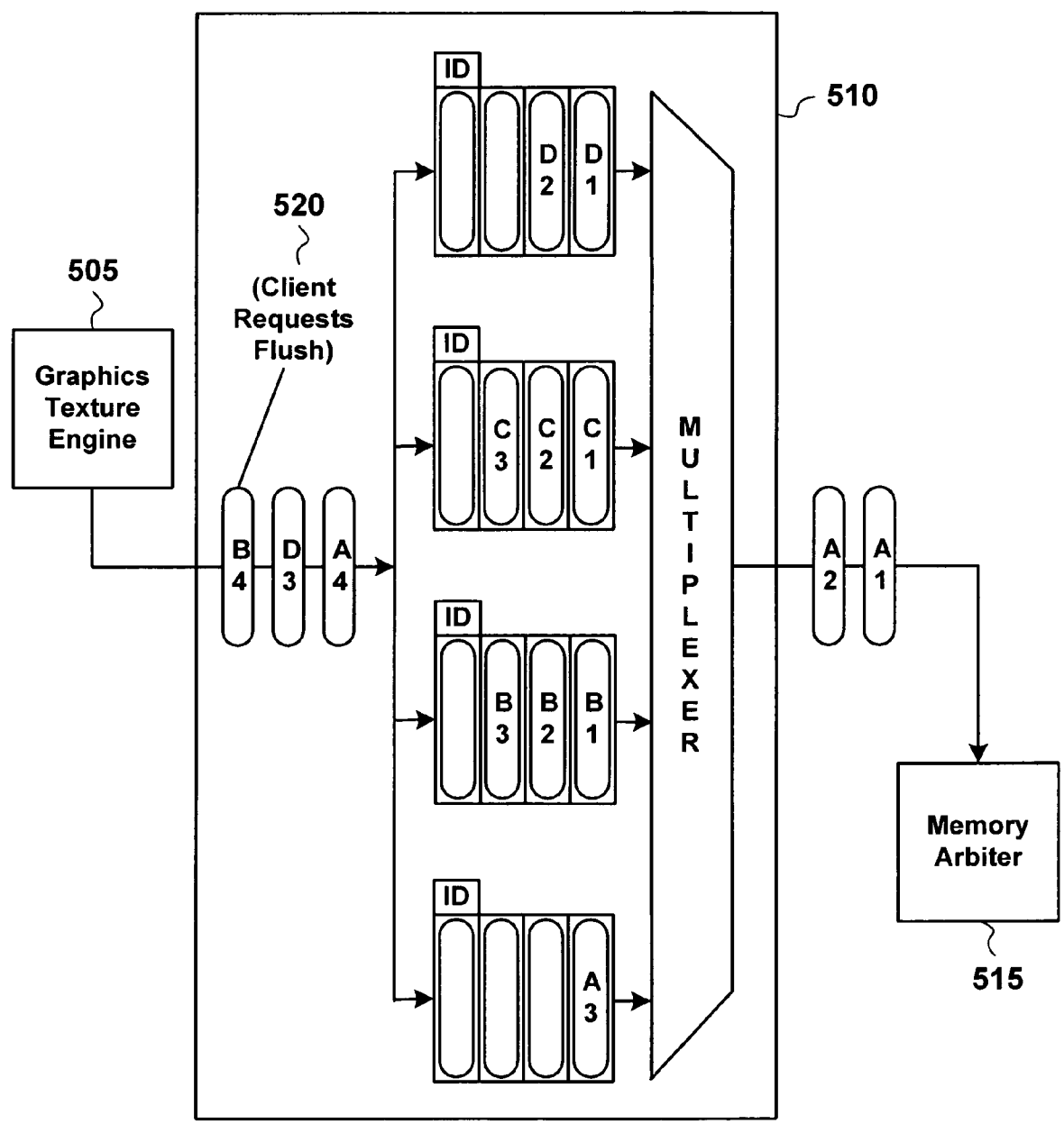
FIG. 5 is a block diagram of a reordering device under a flush condition employing an embodiment of the present invention.

Referring to FIG. 5, a block diagram of a reordering device under a flush condition employing an embodiment of the present invention is shown. The flush results from an external condition, with a request. In this embodiment, cache 510 receives data requests from graphics texture engine 505 to fetch data from several data streams. The multiplexer found within graphics texture engine 505 intermixes the data stream requests. Cache 510 receives the requests and returns the cache hits to client 505. When cache 510 receives the cache miss requests, it forwards the request through the reordering buffers and outputs the reordered requests to memory arbiter 515. The requesting client requests a flush 520, indicates that the reordering device needs to be flushed. This is a "flush-after" event. Flush-after indicates that the data request that is currently being inserted into the FIFOs is part of the current flush class, and will be flushed out of the FIFOs with the current flush.

Figure 6:
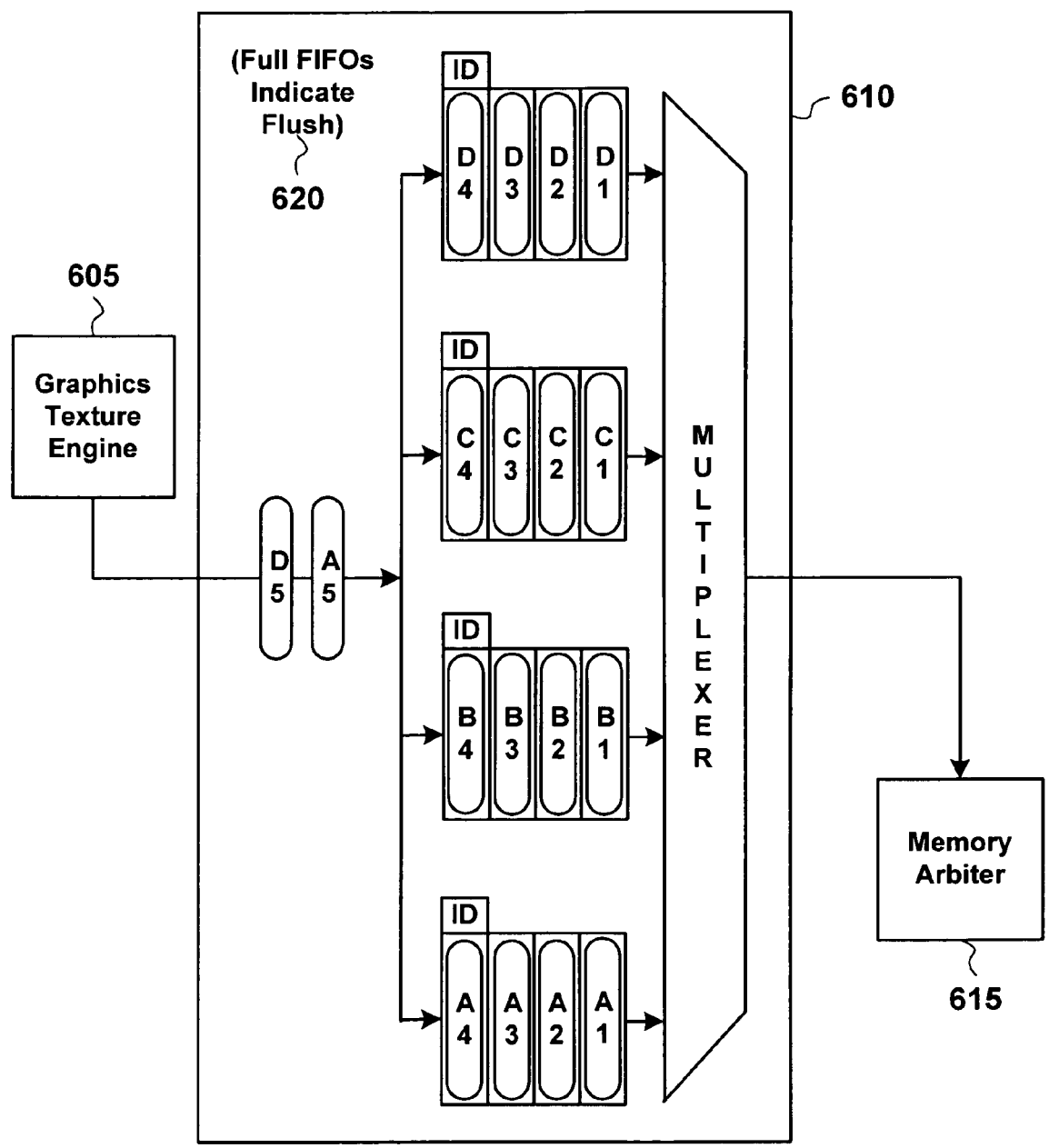
FIG. 6 is a block diagram of a reordering device under a flush condition employing an embodiment of the present invention.

Referring to FIG. 6, a block diagram of a reordering device under a flush condition employing an embodiment of the present invention is shown. The flush results from the FIFOs becoming full. In this embodiment, cache 610 receives data requests from graphics texture engine 605 to fetch data from several data streams. The multiplexer found within graphics texture engine 605 intermixes the data stream requests. Cache 610 receives the requests and returns the cache hits to client 605. When cache 610 receives the cache miss requests, it forwards the request through the reordering buffers and outputs the reordered requests to memory arbiter 615. If all of the FIFOs are full 620, this initiates a flush of the reordering buffers. This only occurs if all of the FIFOs are full and no other flushes than the current flush are ongoing (i.e. no flushes pending).

Figure 7:
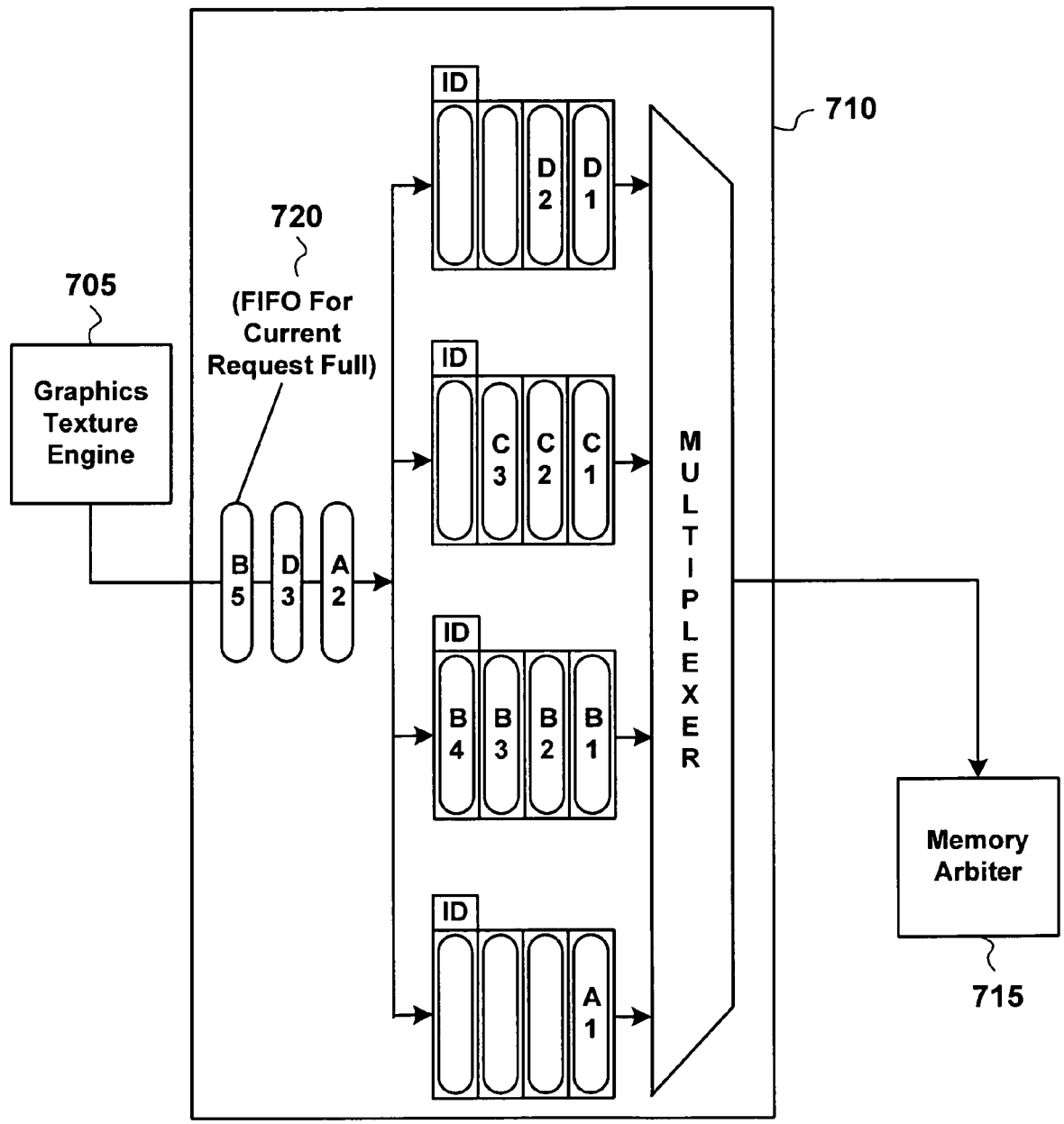
FIG. 7 is a block diagram of a reordering device under a flush condition employing an embodiment of the present invention.

Referring to FIG. 7, a block diagram of a reordering device under a flush condition employing an embodiment of the present invention is shown. The flush results from one FIFO being full, with the current request belonging to that FIFO. In this embodiment, cache 710 receives data requests from graphics texture engine 705 to fetch data from several data streams. The multiplexer found within graphics texture engine 705 intermixes the data stream requests. Cache 710 receives the requests and returns the cache hits to client 705. When cache 710 receives the cache miss requests, it forwards the request through the reordering buffers and outputs the reordered requests to memory arbiter 715. When the FIFO for the current request is full 720, a flush is initiated if no other flushes than the current flush are ongoing. This is a "flush-before" event. Flush-before indicates that the data request that is currently being inserted into the FIFOs is part of the next flush class, and will be flushed out of the FIFOs with the next flush.

Figure 8:
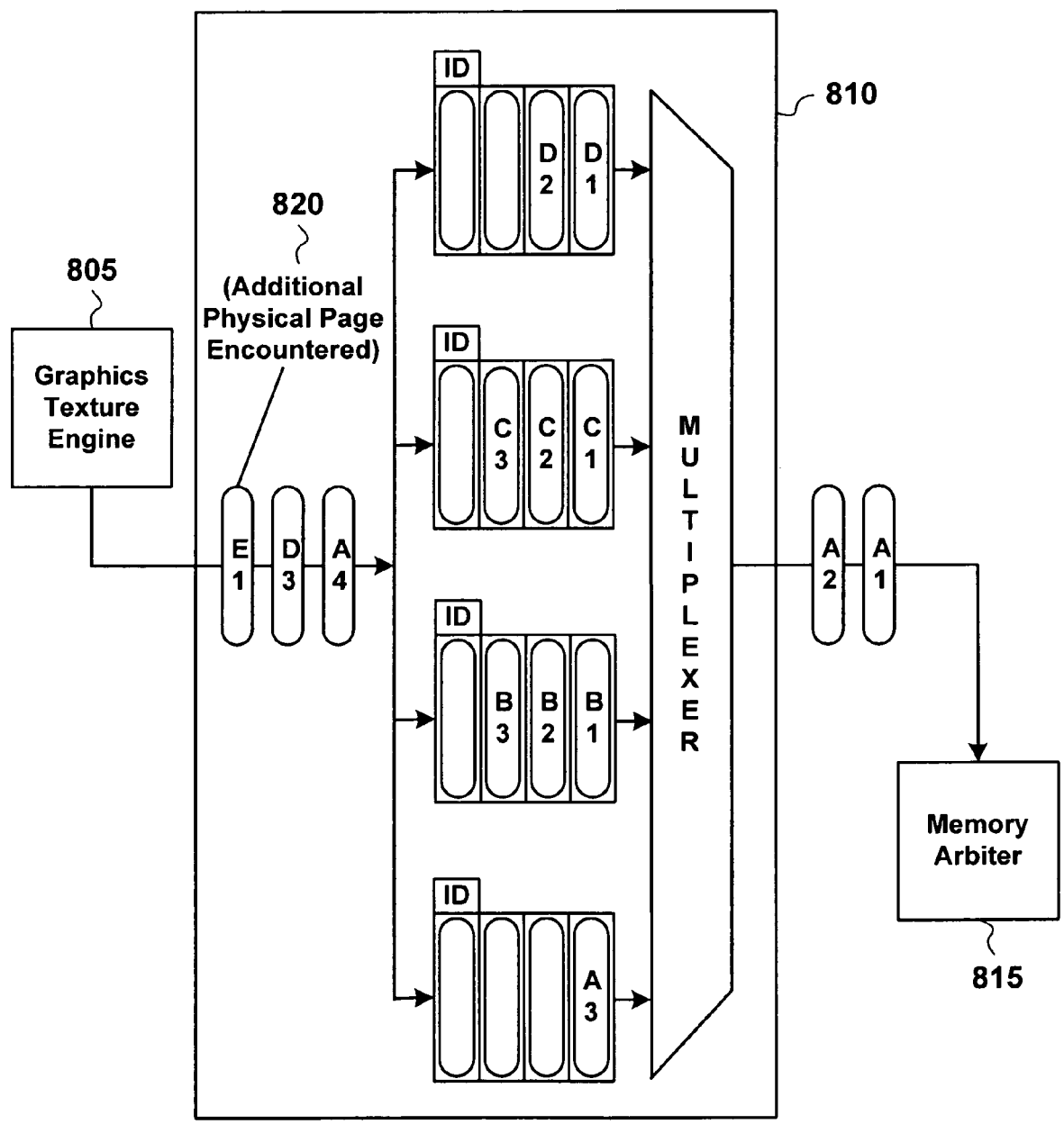
FIG. 8 is a block diagram of a reordering device under a flush condition employing an embodiment of the present invention.

Referring to FIG. 8, a block diagram of a reordering device under a flush condition employing an embodiment of the present invention is shown. The flush results from an additional physical page being encountered by the FIFOs. In this embodiment, cache 810 receives data requests from graphics texture engine 805 to fetch data from several data streams. The multiplexer found within graphics texture engine 805 intermixes the data stream requests. Cache 810 receives the requests and returns the cache hits to client 805. When cache 810 receives the cache miss requests, it forwards the request through the reordering buffers and outputs the reordered requests to memory arbiter 815. When FIFOs encounter an additional physical memory page 820, all the FIFOs are assigned to a physical memory page and the current request does not belong to any of those pages. This is a "flush-before" event. The FIFOs are flushed, and the current request then becomes the first request of the next flush class.

Figure 9:
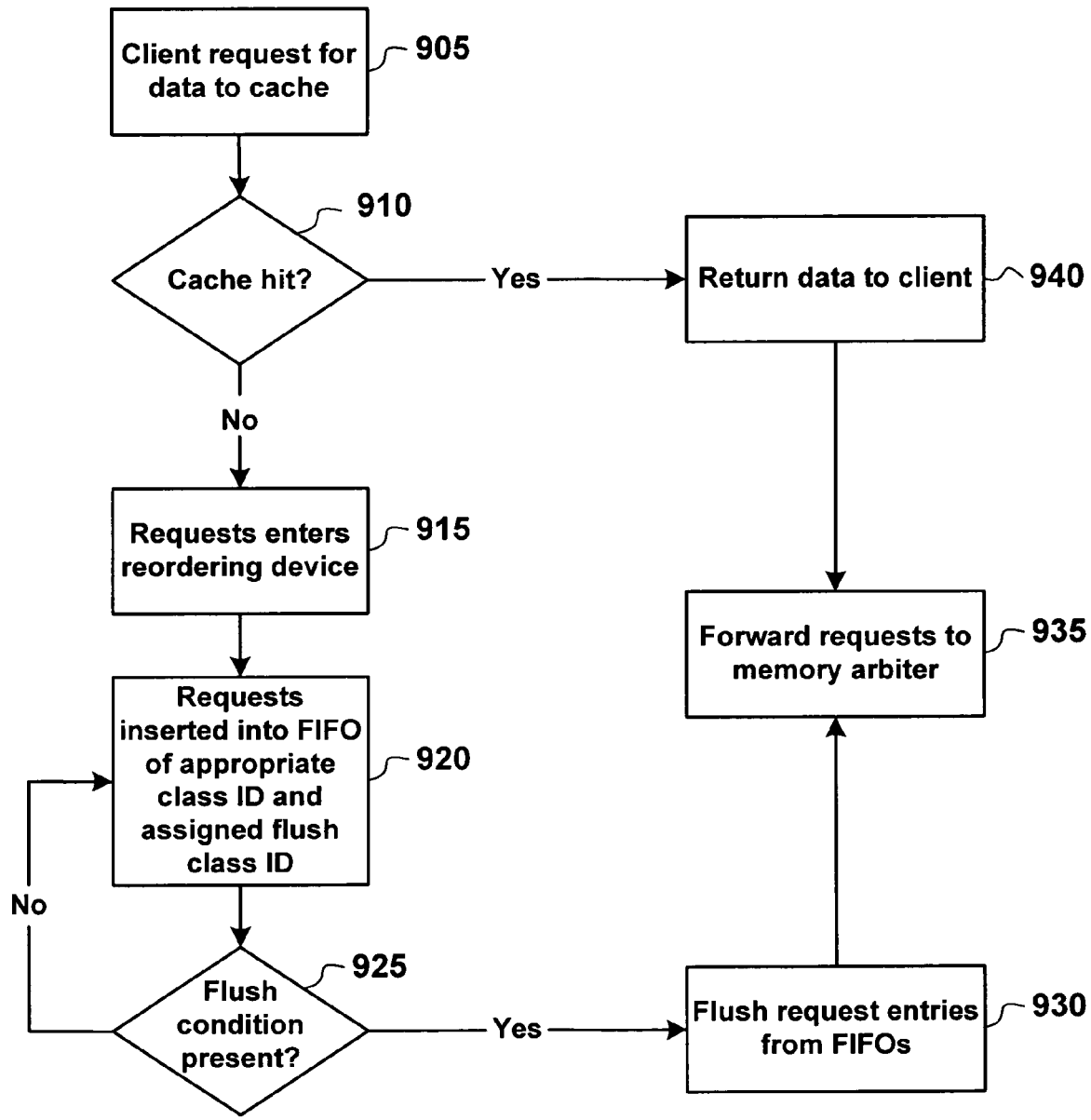
FIG. 9 is a flow diagram showing a cache miss request employing an embodiment of the present invention.

Referring to FIG. 9, a flow diagram showing a cache miss request employing an embodiment of the present invention is shown. A request for data may originate from a client, or more specifically, from a texture graphics engine. Accordingly, in block 905, a client request for data is issued to the cache. Control is then passed to decision block 910, where the data requested is checked within the cache. If the check results in a cache hit, then the data is retrieved and returned to the client in block 940. If the data requested is not found in cache in decision block 905, resulting in a miss, the request is forwarded to the reordering device in block 915. Control then passes to block 920 where the requests are entered into the FIFO of the appropriate class ID and assigned a flush class ID. There may actually be more than one flush class in the FIFOs at any one particular time. However, when emptying the FIFOs, instead of waiting for the FIFO to be empty before moving to the next FIFO, only those entries which belong to a flush class are removed before moving to the next FIFO. In this way, if a flush condition exists to flush out the reorder buffers, the hardware does not have to wait for the FIFOs to empty before writing new data into the FIFOs. Thus, the implementation of the flush class IDs improves the efficiency of the processing of data requests from clients to memory, thereby increasing overall system performance. As the FIFOs are filled with requests, control passes to decision block 925 where the reordering device awaits a flush condition. If a flush condition is not present, the requests continue to fill the FIFOs in block 920. If a flush condition is found in decision block 925, control then passes to block 930. In block 930, the request entries from the corresponding flush class are flushed from the FIFOs. These requests are forwarded to the memory arbiter in block 935, where the data requests streams have gained some page coherency. Control then passes to block 940 to fulfill the data stream requests in memory and return the appropriate data to the client.

Figure 10:
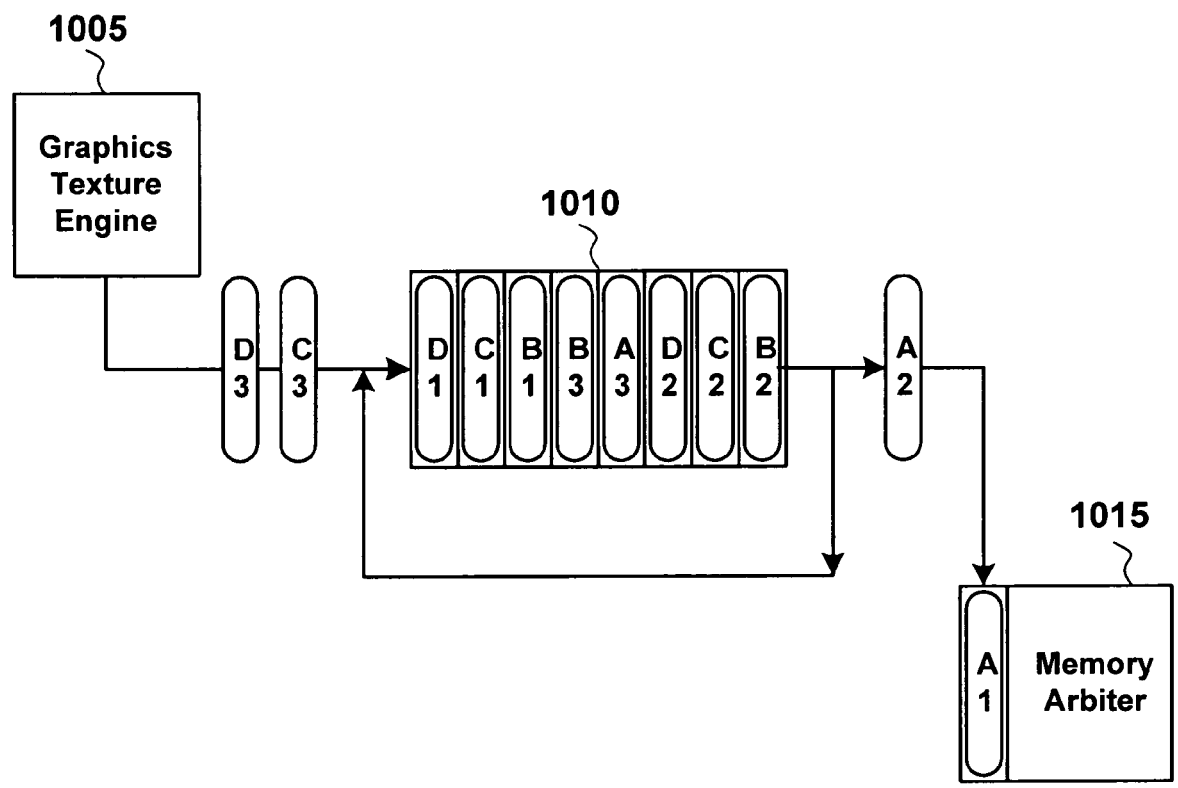
FIG. 10 is a block diagram of a reordering device employing an embodiment of the present invention.

Referring to FIG. 10, a block diagram of a reordering device employing an embodiment of the present invention is shown. In an embodiment of the invention, data streams requests are forwarded from a client to the reordering device. For example, the client may include a graphics texture engine 1005 or a cache (not shown). In an embodiment of the invention, different cache miss requests streams are placed in FIFO 1010. On output, the first data stream request is presented to memory arbiter 1015. The requests in FIFO 1010 are circulated until a data request from the same physical memory page can be found and also presented to the memory arbiter. If is FIFO 1010 has no matching request(s), the data request is sent to memory as a single request. This process can be repeated for the next data request in the FIFO 1010. In an embodiment of the invention, in the event that FIFO 1010 is not receiving enough cache miss requests, a watermarking scheme can be utilized to stall the first request from being presented to memory arbiter 1015 until the FIFO has any given number of requests.

Although a single embodiment is specifically illustrated and described herein, it will be appreciated that modifications and variations of the present invention are covered by the above teachings and within the purview of the appended claims without departing from the spirit and intended scope of the invention.

What is claimed is:

1. A method of reordering data requests, comprising:
   inserting each of said requests into one of a plurality of buffers, each buffer having an associated physical memory page identification tag, wherein said requests are for data streams residing in separate physical memory pages;
   marking said requests with a physical memory page identification tag which corresponds to one of said physical memory pages from which said data streams reside, wherein each of said requests marked with a physical memory page identification tag is inserted in said buffers assigned with a corresponding page ID and wherein said buffers are First-In First-Out buffer devices (FIFOs);
   determining if a flush condition is present;
   removing said requests from said buffers during a flush based on said physical memory page identification tag, wherein said flush occurs in a round-robin fashion, such that each of said buffers, in succession, removes said requests and wherein, during said flush, all of said requests marked with a first physical memory page identification tag are removed from said buffer with corresponding first physical memory page identification tag prior to removing said requests with a second physical memory page identification tag in said buffer with corresponding second page ID; and
   marking said requests inserted in said buffers with one of a plurality of flush class identification tags.

2. The method of claim 1 wherein said requests marked with the same flush class identification tag are associated with a flush class.

3. The method of claim 2 wherein said requests of a flush class are removed together from said buffers during said flush.

4. A memory request reordering system comprising:
   a client to send requests to memory, wherein said data requests are for data streams residing in separate physical memory pages, wherein said data requests are marked with a physical memory page identification tag which corresponds to one of said physical memory pages from which said data streams reside, and wherein each of said requests marked with a physical memory page identification tag is inserted in one of a plurality of buffers assigned with a corresponding physical memory page identification tag;
   a reordering device coupled to said client to receive said requests; and
   a memory arbiter coupled to said reordering device to selectively remove requests from said reordering device when a flush condition is present, wherein said requests are removed from said buffer during a flush based on said physical memory page identification tag, wherein said buffers are emptied in a "round-robin" fashion, such that each of said buffers, in succession, removes said requests,
   wherein said requests inserted into buffers are marked with one of a plurality of flush class identification tags.

5. The reordering system of claim 4 wherein said requests marked with the same flush class identification tag are associated with a flush class.

6. The reordering system of claim 5 wherein said requests of a flush class are removed together from said buffers during said flush.

* * * * *